United States Patent [19]

Ellsworth

[11] Patent Number: 5,072,376
[45] Date of Patent: Dec. 10, 1991

[54] MEASURING UTILIZATION OF PROCESSOR SHARED BY MULTIPLE SYSTEM CONTROL PROGRAMS

[75] Inventor: Robert S. Ellsworth, Issaquah, Wash.

[73] Assignee: Amdahl Corporation, Sunnyvale, Calif.

[21] Appl. No.: 205,301

[22] Filed: Jun. 10, 1988

[51] Int. Cl.⁵ .......................... G06F 9/44; G06F 11/34
[52] U.S. Cl. ...................... 395/650; 364/238; 364/259; 364/263.3; 364/269.4; 364/281.4; 364/286; 364/942; 364/942.5; 364/948.11; 364/DIG. 1; 364/DIG. 2
[58] Field of Search ... 364/200 MS File, 900 MS File; 395/650

[56] References Cited

U.S. PATENT DOCUMENTS

| | | | |
|---|---|---|---|
| 4,432,051 | 2/1984 | Bogaert et al. | 364/200 |
| 4,485,440 | 11/1984 | Duff et al. | 364/200 |
| 4,495,562 | 1/1985 | Yamaji et al. | 364/200 |
| 4,638,427 | 1/1987 | Martin | 364/200 |
| 4,642,756 | 2/1987 | Sherrod | 364/200 |
| 4,890,227 | 12/1989 | Watanabe | 364/200 |
| 4,905,171 | 2/1990 | Kiel et al. | 364/551.01 |
| 4,924,428 | 5/1990 | Vea | 364/900 |

*Primary Examiner*—David Y. Eng
*Assistant Examiner*—Ayni Mohamed
*Attorney, Agent, or Firm*—Fliesler, Dubb, Meyer & Lovejoy

[57] ABSTRACT

In a computer system wherein control of a processor is time multiplexed among more than one system control program, the utilization by a system control program of the processor during a predetermined time interval is determined by accumulating processor idle time for said system control program during said time interval, adjusting the processor idle time accumulated for said system control program by time periods wherein said system control program does not have control of the processor; and subtracting said real idle time from said interval time to obtain CPU busy time.

11 Claims, 2 Drawing Sheets

MEASURING UTILIZATION OF PROCESSOR SHARED BY MULTIPLE SYSTEM CONTROL PROGRAMS

TECHNICAL FIELD

This invention relates to computer systems that support concurrent operation of multiple system control programs. Specifically, the present invention relates to a method for measuring the utilization of a central processing unit (CPU) by one of multiple system control programs operating concurrently in a computer system.

BACKGROUND OF THE INVENTION

Most modern large scale computer systems generally support multiprogramming, i.e. concurrent processing of more that one job. Among the jobs processed by a large computer system, some, like those in text editing applications, are input/output (I/O) intensive for which only sporadic CPU functions are involved; others, such as those relating to accounting or scientific applications, are processor intensive for which extensive CPU involvement is required.

To optimize resource utilization, a balanced mix of jobs is usually scheduled in a computer system, so that if the CPU is too busy and becomes the bottle neck of the computer system, then the system should be "tuned" by initiating more I/O-intensive jobs. On the other hand, if the CPU is under-utilized because it is frequently waiting on the I/O devices, then it becomes desirable to tune the system by initiating more processor-intensive jobs in the system.

Resources and activities in a computer system, including job scheduling, are controlled by a system control program (SCP), otherwise known as an operating system. The SCP schedules the resources and activities of a computer system in accordance with predefined scheduling and resource allocation schemes implemented to achieve predefined performance objectives. For example, if a computer system is intended to be used for interactive processing, then the SCP will be implemented so that input/output operations and job switching are more efficiently handled, on the other hand, if the computer system is intended to be used for database processing, then the SCP will be implemented to more efficiently handle information storage and retrieval.

Because of the ever increasing processing power of large scale computer systems, the probability that a computer system is used to run a diversity of jobs continue to increase. It has been realized that no longer can all the users be satisfied if only a single SCP is installed in a computer system.

To accommodate processing in a diversified application environment, modern large scale computer systems such as the Amdahl 580 allow multiple SCPs to operate concurrently in one system. Each of the multiple SCPs runs within one of multiple domains and operates within the domain as though it has sole possession of a real computer. The domains share one or more CPUs in a time multiplexed manner. The advantages provided by these multiple domain systems include the ability to: consolidate workloads for efficient operation by assigning all work of a given type of workload to the same domain, consolidate several smaller systems into one system for more efficient operation by processing the workload from each of the smaller systems in its own domain, and run a production system in one domain while developing and testing a new application in another domain.

To tune and provide capacity planning for computer system, a knowledge of its CPU utilization becomes important.

CPU utilization is usually measured in terms of its busy time. In conventional SCPs such as the VM/370 and MVS, CPU busy time is measured by a facility (such as RMF in MVS and SMART in VM) which accumulate the CPU idle time within a given time interval, and then determine the CPU busy time by:

CPU BUSY TIME = INTERVAL TIME – MEASURED WAIT TIME

This method works satisfactorily in a conventional system when a CPU is under the sole control of a single SCP. In a system where the CPU is shared by multiple SCPs and where a SCP has to give up control of the CPU periodically, the CPU busy time will become inflated since the SCP has no knowledge of the amount of time that it has control of the CPU. The size of the inaccuracy in any given interval of time is the amount of time during which the domain is not active, i.e. when the domain does not have access to the CPU.

What is needed is a method for accurately determine CPU busy time in a computer system wherein control of the CPU is shared by more than one system control program.

SUMMARY OF THE INVENTION

The present invention is a method for measuring utilization by a system control program of the processor during a given time interval in a computer system wherein control of a processor is time multiplexed among more than one system control program. The method comprising the steps of: accumulating wait time of the processor while it is controlled by the system control program during the given time interval; adjusting the wait time accumulated by nondispatched time periods during which the system control program does not have control of the processor to obtained an adjusted wait time; and subtracting the adjusted wait time from said given time interval to obtain processor busy time, said processor busy time representing utilization by the system control program of the processor.

DESCRIPTION OF THE PREFERRED EMBODIMENT

Figure 1:
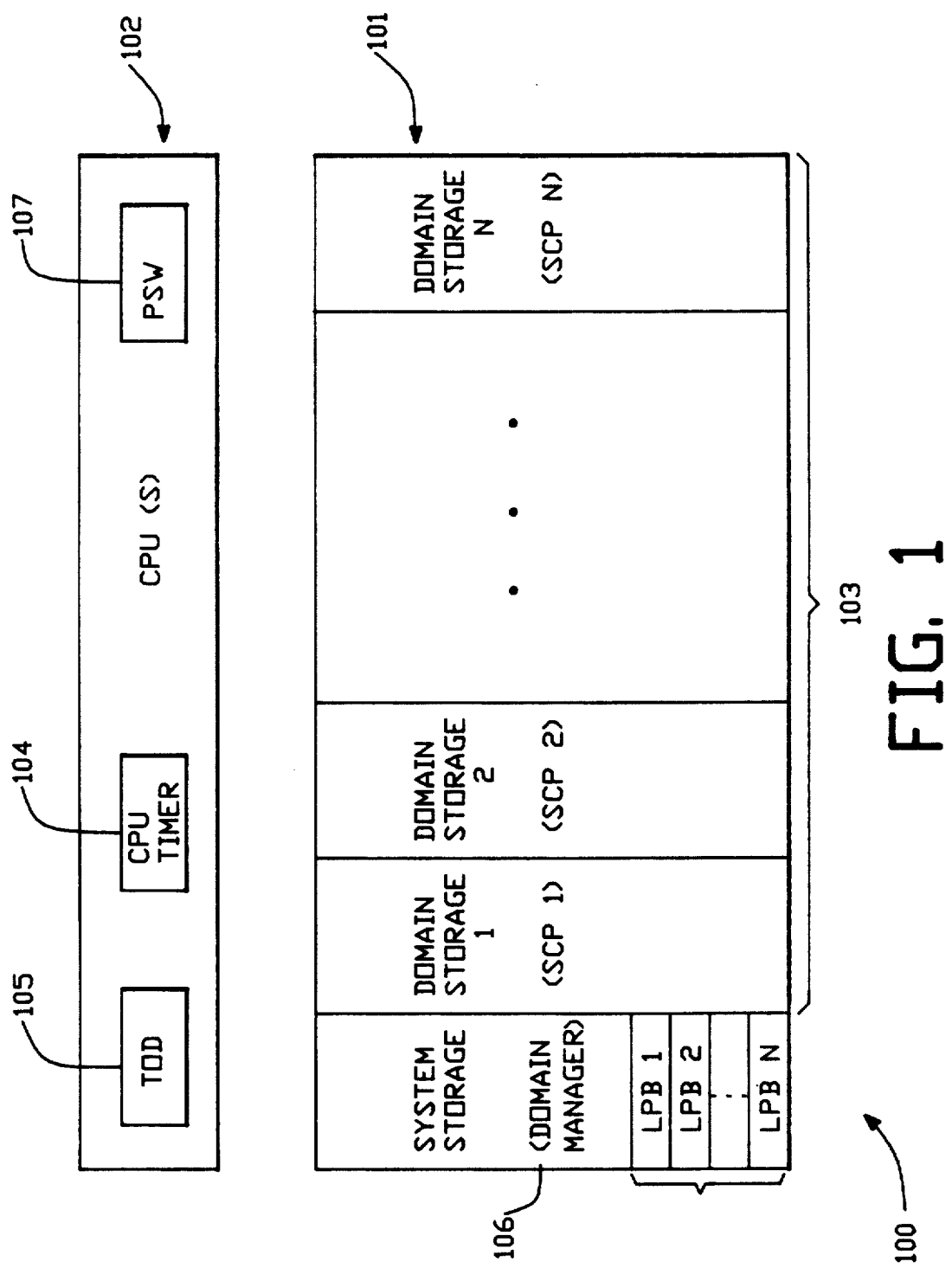
FIG. 1 is a block diagram of a multiple domain computer system wherein the present invention is embodied.

FIG. 1 illustrates a computer system 100 wherein the present invention is embodied. The computer system 100 has an architecture similar to the Amdahl 580 series systems, comprising a mainstore 101, and a processing unit (CPU) 102. Included as part of the CPU 102 are one or more channels (not shown) which interface and communicate with external input/output and storage devices. Although this embodiment is described with reference to a single CPU, the computer system 100 can include multiple CPUs and operates as a multiprocessor system.

The computer system 100 provides a multi-domain 103 capability in which a plurality of System Control Programs, SCP1, SCP2 . . . SCPn, can operate concurrently in the system with each SCP running within a respective one of multiple domains as though it has sole possession of a real machine. Each domain comprises a domain storage and a plurality of real and logical resources. A domain in computer system provides an architectural environment that is compatible with either the IBM System/370 architecture as described in System/370 Principles of Operation, IBM Publication number GA22-7085 or the IBM System/370 extended architecture described in System 370/Extended Architecture Principles Of Operation, IBM Publication No. SA22-7085.

Included as part of the CPU is a CPU timer 104, and a time-of-day (TOD) clock 105. The TOD clock 105 provides a consistent measure of elapsed time suitable for the indication of date and time. Normally, the TOD 105 clock is set at system initialization time. The CPU timer 104 provides a means for measuring elapsed CPU time and for causing an interruption when a prespecified amount of time has elapsed.

Assigned as logical resources to a domain include the CPU along with its CPU timer 104 and a TOD clock 105. The logical resources are not owned by a domain, but are shared in a time multiplexed manner among the domains. Arbitration and scheduling of the resources among the domains are performed by a domain manager 106. When the domain allocates the CPU 102 to a domain, that domain is said to be "dispatched" by the domain manager 106. When the domain manager 106 takes the CPU 102 away from a dispatched domain, that domain is said to have been "interrupted" by the domain manager 106.

The domain manager 106 is implemented as a "super" system control program whose software code resides in a fixed part of the mainstore 101 called the system storage. The system executes the domain manager 106 in system control state. System control state is entered when a domain is interrupted or dispatched. A domain is interrupted or dispatched at the occurrence of prespecified events, such as when allotted time slot of a dispatched domain has been exhausted, when the SCP of a dispatched domain becomes idle, or when another domain requires immediate services of the CPU.

Information pertinent to each domain, including its status at the time of interruption, is stored in preassigned locations LPB1, LPB2 . . . LPBn, of the system storage, collectively referred to as the logical processor block (LPB) of the domain. According the preferred embodiment, the LPB of a domain include:
  an "INTERRUPTED TIME" field representing the time of day clock value whereat the domain is last interrupted;
  a "CPU TIME SAVE" field saving the value of the CPU timer;
  a "WAIT FIELD POINTER" field pointing to the location where the idle time of the CPU is stored.

In accordance with System/370 architecture, when CPU 102 becomes idle (i.e. in a wait state), a bit (14) in the PSW (program status word) 107 of the CPU will be set. In system control programs such the MVS and VM, a wait task will be initiated by a SCP when the CPU becomes idle. At the initiation of the wait task, the CPU timer 104 is first initialized. When the CPU 102 leaves the idle state, the initial value of the CPU timer minus the current value of the CPU timer will give the idle time interval. The SCP accumulates the time interval by adjusting to the accumulated wait time value stored in a predefined location by the idle time interval. In MVS, such predefined location is called LCCWTIM (local CPU communication area—wait time). In VM, the predefined location is called IDLEWAIT, which, along with IOWAIT and PAGEWAIT, form the total wait time.

Figure 2:
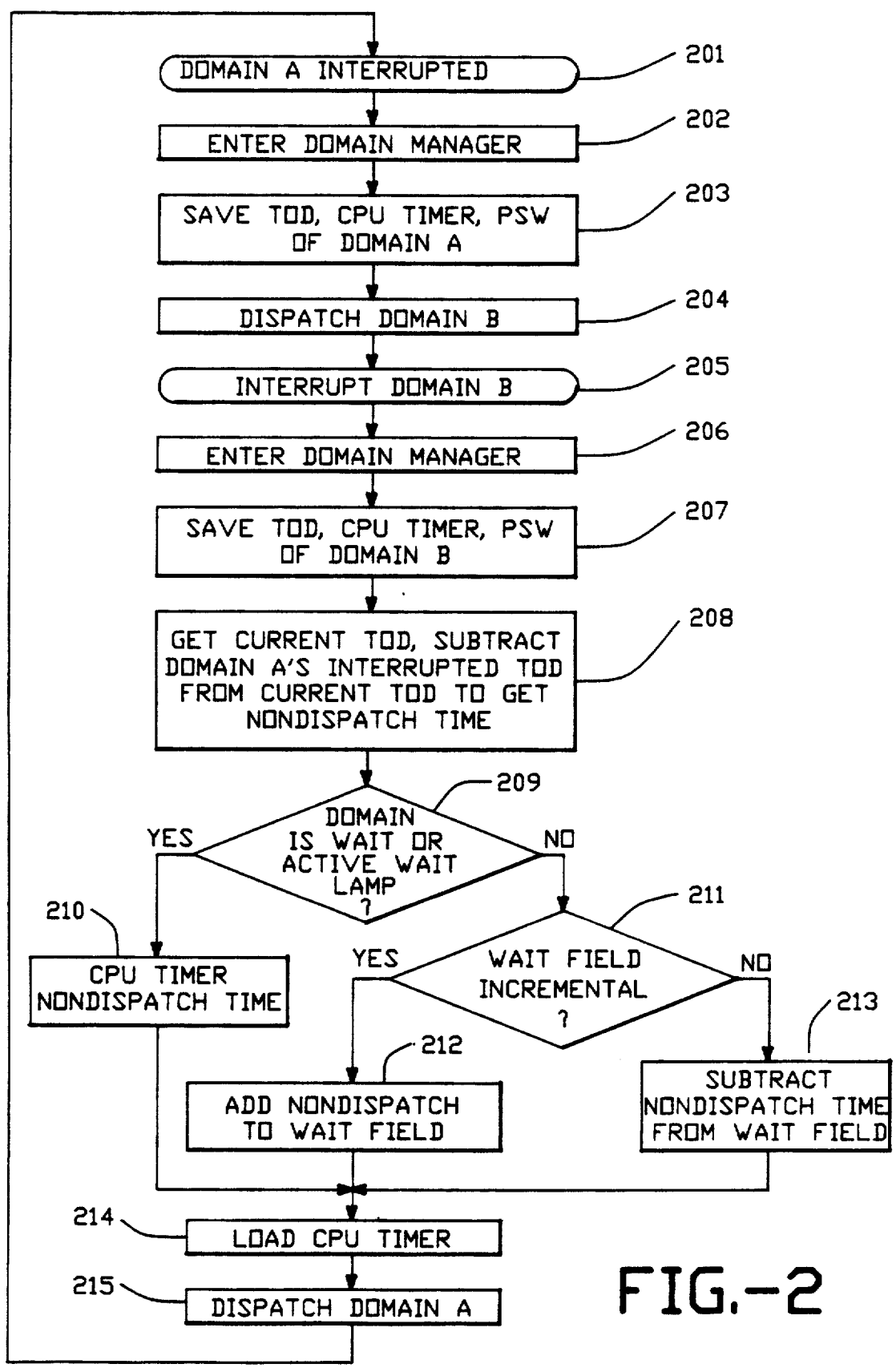
FIG. 2 illustrates the operation of the domain manager for adjusting the wait time of a SCP according to the preferred embodiment of this invention.

FIG. 2 illustrates the operation of the domain management whereby wait time adjustment is accomplished. When a domain, say domain A, is interrupted (block 201), the domain manager will be activated (block 202). The domain manager saves the CPU timer and the TOD clock 105 values respectively into the "CPU TIMER SAVE" and the "INTERRUPTED TIME" fields of the LPB along with the PSW, which contains the status of the CPU at the time of interruption (block 203). The domain manager then dispatches another domain, say domain B, (block 204).

In the preferred embodiment, the user is allowed the option to specify whether wait time adjustment is wanted. To activate the wait time adjustment facility in a domain operating under MVS, a user initiates a job in the domain. The job then passes the location LCCWTIM wherein the accumulated wait time is stored to the domain manager. This location will be adjusted if the CPU of the domain is busy just before the domain is dispatched. To activate the wait time adjustment facility in a domain operating under VM, a CMS command is issued by the user. The command passes the location of a field IDLEWAIT to the domain manager.

Assume that the user of domain B has specified that no wait time adjustment is needed. When domain B is interrupted (block 205), the domain manager is again activated (block 206). Assume that domain A is again dispatched, after saving parameters of domain B (block 207), the domain manager retrieves the current TOD clock and subtracts the value stored in "INTERRUPTED TIME" of domain A from the current TOD clock value to obtain a wait time adjustment value (block 208). This wait time adjustment value gives the time period during which the domain was not dispatched, i.e. the nondispatched time. The nondispatched time represent a time period during which the SCP of a domain A does not have control of the CPU.

As part of its dispatching procedure, the domain manager checks the value of the stored PSW (block 209). If bit 14 (the wait bit) of the PSW is on or the PSW indicates a VM Idle wait loop, the domain manager knows that the domain A was in a wait state at the time of interruption. The domain manager will then subtract the wait time adjustment value (or the nondispatched time period, which is equal to TOD at dispatch time — INTERRUPTED TIME) from the "CPU TIMER SAVE" field before it is reloaded into the CPU timer (block 210).

On the other hand, if bit 14 of the stored PSW is off, or the PSW does not indicate an idle wait loop (such as in VM), then the domain A was in a busy state at the time of the interrupt. In this case, the domain manager will access the pointer stored at WAIT FIELD. This pointer points to the predefined location, such as LCCWTIM and IDLEWAIT, which contains the accumulated wait time. The domain manager will use the wait time adjustment value to adjust the accumulated wait time.

According to the preferred embodiment, the user of a domain is allowed the option to specify whether the wait time is accumulated by incrementing the accumulated wait time or by decrementing it. The user can indicate the choice of using an incrementing accumulated wait time value (as is the case with MVS) by setting a field (LPBTAI) in the LPB. Conversely, the user can indicate the choice of using a decrementing accumulated wait time value (as is the case with VM) by setting a field (LPBTAD) in the LPB. If LPBTAI is specified (block 211), then the domain manager will add the adjustment value to the accumulated wait time (e.g. MVS's LCCWTIM) (block 212). If LPBTAD is specified, then the domain manager will subtract the adjustment value from the accumulated wait time value (i.e. VM's IDLEWAIT) (block 213).

When the above procedure is done, the CPU TIMER and other parameters are reloaded (block 214), and domain A is again dispatched (block 215).

The foregoing description of the preferred embodiment of the present invention has been presented for the purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

I claim:

1. In a computer system wherein control of a processor is time multiplexed among more than one system control program, a method for measuring utilization by a system control program of the processor during a given time interval, comprising the steps by the computer system of:

storing a given time value representing the given time interval;

accumulating a wait time value representing the wait time of the processor while the processor is controlled by the system control program during said given time interval;

accumulating a nondispatched value representing the nondispatched time when the processor is not controlled by the system control program during said given time interval;

adjusting the wait time value accumulated for the system control program by the nondispatched value to obtain an adjusted wait time value, and subtracting the adjusted wait time value from said given time value to obtain a processor busy time, said processor busy time representing utilization of the processor by the system control program.

2. The method as in claim 1, wherein said wait time is accumulated by the steps of:

using a timer to measure wait intervals during which the processor is controlled by the system control program and is idle; and accumulating all wait intervals measured into a prespecified location.

3. The method as in claim 2, wherein said timing and adding steps are performed by a wait task being initiated by the system control program when said processor becomes idle.

4. The method as in claim 3, wherein said adjusting step includes the steps of:

if the system control program is interrupted when a wait task is initiated, then adjusting the timer by the nondispatched time periods; and if the system control program is interrupted when the wait task is not initiated, then adjusting said prespecified location by the nondispatched time periods.

5. The method as in claim 1, wherein said nondispatched time periods are determined each by registering a first value representing time of day clock whereat control of the processor is taken from the system control program and a second value representing time of day clock whereat control of the processor is returned to the system control program, and subtracting said first value from said second value.

6. In a computer system wherein control of a processor is time multiplexed among more than one system control program, apparatus for measuring utilization by a system control program of the processor during a given time interval, comprising:

means for storing the given time interval;

means for accumulating a wait time of the processor when the processor is controlled by the system control program during said given time interval;

means for determining the nondispatched time periods when the processor is not controlled by the system control program during said given time interval;

means for adjusting the processor wait time by said nondispatched time periods to obtain an adjusted wait time; and means for subtracting the adjusted wait time from said given time interval to obtain processor busy time, said processor busy time representing utilization by the system control program of the processor.

7. The apparatus as in claim 6, wherein accumulating means includes:

timer means for measuring wait time intervals during which the processor is controlled by the system control program and is idle; and means for accumulating all wait time intervals measured into a prespecified location.

8. The apparatus as in claim 7, including a wait task initiated by the system control program for controlling said timer means and said adding means.

9. The apparatus as in claim 8, wherein said adjusting means includes:

means for adjusting said timer by the nondispatched time periods if the system control program is interrupted when the wait task is initiated; and means for adjusting said prespecified location by the nondispatched time periods if the system control program is interrupted when the wait task is not initiated.

10. The apparatus as in claim 6, further comprising means for determining said nondispatched time period including:

means for registering a first value representing time of day clock whereat control of the processor is taken from the system control program and a second value representing time of day clock whereat control of the processor is returned to the system control program: ad means for subtracting said first value from said second value.

11. In a multi-domain system wherein at least one central processing unit, at least one timer and at least one time-of-day clock are time-multiplexed among more than one system control program, a method for measuring the busy time of a central processing unit during a given time interval while the central processing unit is under control of one of said system control programs, the method comprising the steps in a computer of:

accumulating the wait time of the processor while the processor is controlled by the one of said system control program during the given time interval, including the steps of initiating a wait task which operates a timer to measure wait time intervals during which the processor is controlled by the one of said system control programs and is idle, and accumulating all wait time intervals measured into a prespecified location;

adjusting the wait time accumulated for the one of said system control programs by nondispatched time periods to obtain an adjusted wait time including the steps of if the one of said system control programs is interrupted when a wait task is initiated, then adjusting said timer by the nondispatched time periods, and if the one of said system control programs is interrupted when the wait task is not initiated, then adjusting said prespecified location by nondispatched time periods, said nondispatched time periods being time intervals during which the one of said system control programs does not have control of the processor, said nondispatched time periods being determined each by registering a first value representing the time of day clock whereat control of the processor is taken from the one of said system control programs and a second value representing the time of day clock whereat control of the processor if returned to the one of said system control programs, and subtracting said first value from said second value; and subtracting the adjusted wait time from said given time interval to obtain the processor busy time, said processor busy time representing utilization by the one of said system control programs of the processor.

* * * * *